United States Patent
Murphy et al.

(10) Patent No.: US 11,679,389 B2
(45) Date of Patent: Jun. 20, 2023

(54) MANTLE RETAINING SYSTEM AND METHOD FOR A GYRATORY CRUSHER

(71) Applicant: Metso Outotec USA Inc., Waukesha, WI (US)

(72) Inventors: William Murphy, Milwaukee, WI (US); Lucas Steiner, Hartford, WI (US); Brian Meier, Waukesha, WI (US); Scott Friedrichs, New Berlin, WI (US)

(73) Assignee: Metso Outotec USA Inc., Waukesha, WI (US)

( * ) Notice: Subject to any disclaimer, the term of this patent is extended or adjusted under 35 U.S.C. 154(b) by 0 days.

(21) Appl. No.: 17/326,466

(22) Filed: May 21, 2021

(65) Prior Publication Data
US 2022/0371021 A1    Nov. 24, 2022

(51) Int. Cl.
*B02C 2/04* (2006.01)
*F16B 39/02* (2006.01)
*B02C 2/00* (2006.01)

(52) U.S. Cl.
CPC ............... *B02C 2/04* (2013.01); *F16B 39/02* (2013.01)

(58) Field of Classification Search
CPC .. B02C 2/04; B02C 2/005; B02C 2/00; B02C 2/02; B02C 2/047
See application file for complete search history.

(56) References Cited

U.S. PATENT DOCUMENTS 6,299,083 B1  10/2001  Polinski et al.
8,832,921 B2   9/2014  Marks et al.
(Continued)

FOREIGN PATENT DOCUMENTS

DE    1283654 B  *  11/1968
DE    1283654 B     11/1968
(Continued)

OTHER PUBLICATIONS

English translate (DE1283654B), retrieved date Nov. 6, 2022. (Year: 2022).*
(Continued)

*Primary Examiner* — Shelley M Self
*Assistant Examiner* — Mohammed S. Alawadi
(74) *Attorney, Agent, or Firm* — Andrus Intellectual Property Law, LLP

(57) ABSTRACT

A retainer assembly for securing a mantle to a mainshaft of a gyratory crusher. The retainer assembly includes a headnut and a burn ring that are joined to each other prior to installation. The headnut includes a first and a second series of bores that each extend though the annular headnut. A series of jacking bolts are installed in the second series of bores and a series of connector are installed in the first series of bores. The combination of the headnut and burn ring are installed on the mainshaft. Once in place, the connectors are removed and a series of cylinders are positioned in the first series of bores. The cylinders are pressurized to create a gap between the headnut and the burn ring. The series of jacking bolts are rotated to maintain the gap and one or more shims can be positioned in the gap. The cylinder are removed and a headnut cover is installed to protect the headnut. During removal of the headnut, the cylinders can be reinstalled and pressurized.

15 Claims, 9 Drawing Sheets

(56) References Cited

U.S. PATENT DOCUMENTS

| | | | |
|---|---|---|---|
| 9,157,469 B2 | 10/2015 | Marks et al. | |
| 10,814,329 B2 | 10/2020 | Niklewski et al. | |
| 2011/0309176 A1 | 12/2011 | Kuvaja | |
| 2013/0011213 A1 | 1/2013 | Marks et al. | |
| 2019/0134640 A1* | 5/2019 | Hopping | B02C 2/00 |
| 2019/0264726 A1 | 8/2019 | Hunter et al. | |
| 2021/0322995 A1* | 10/2021 | Bucknell | B02C 2/06 |

FOREIGN PATENT DOCUMENTS

| | | |
|---|---|---|
| DE | 102014105029 A1 | 10/2015 |
| EP | 2929940 A1 | 10/2015 |
| WO | 2020073077 A1 | 4/2020 |
| WO | 2021013329 A1 | 1/2021 |

OTHER PUBLICATIONS

International Search Report and Written Opinion issued in corresponding Application PCT/US2022/029993 dated Sep. 14, 2022.

* cited by examiner

MANTLE RETAINING SYSTEM AND METHOD FOR A GYRATORY CRUSHER

BACKGROUND

The disclosed system generally relates to a gyratory crusher as used in the mining industry. More specifically, the present disclosure relates to a retainer assembly that includes a headnut that can be used to secure a mantle to a mainshaft of a gyratory crusher.

Gyratory type crushers are used in the mining industry for reducing ore to a predetermined size for further processing. These style of crushers have taken over most large hard-ore and mineral-crushing applications which has made them an integral part of the mining industry. Typically, a gyratory crusher includes a stationary conical bowl which opens upwardly and has an annular opening in its top to receive feed material. A conical pestle, opening downwardly, is disposed within the center of the bowl. The pestle is eccentrically oscillated for gyratory crushing movement with respect to the bowl. The conical angles of the pestle and bowl are such that the width of the passage decreases towards the bottom of the working faces and may be adjusted to define the smallest diameter of product ore. The oscillatory motion causes impact with the pestle and bowl, as a piece of ore is caught between the working faces of the bowl and pestle. Furthermore, each bowl and pestle includes a liner assembly replaceably mounted on the working faces, these liners define the actual crushing surface.

The liner on the pestle, called a mantle, is fitted around the outside of a mainshaft. The mantle provides a replaceable wearing surface. A threaded section on the mainshaft (or a threaded bearing sleeve fit over the mainshaft) is provided for receiving a headnut. The headnut forces the mantle downward onto the tapered portion of the mainshaft, and is forceably tightened against the top of the mantle. Tightening of the headnut prevents relative rotational movement between the headnut and the mantle. When the crusher is put into operation, the large forces involved in crushing stone cause a differential rotational movement between the mainshaft and the mantle. The headnut on the threaded section of the mainshaft is also caused to rotate relative to the shaft, in a direction which acts to further tighten the headnut onto the mantle. Thus, the rotational movement of the headnut relative to the mainshaft causes a large force to be transmitted in a downward direction from the headnut so as to forceably wedge the mantle onto the tapered portion of the mainshaft, securing the mantle to the mainshaft. The force also causes the bottom surface of the headnut to be pressed tightly against the top surface of the mantle such that the frictional force between the headnut and the mantle is quite large.

The frictional force between the headnut and the mantle makes it difficult to loosen the headnut by turning. Additionally, during operation of the crusher, the crushing surface of the mantle is subjected to a hammering action by repeated impact of the rock or other material being crushed. This hammering action causes the working surface of the mantle to expand by cold working. The expansion of the mantle works to increase the fictional force between the headnut and the mantle. The cumulative effect of the tremendous frictional force between the headnut and the mantle is that it becomes impossible to loosen the headnut by turning it.

It is, however, necessary to remove the headnut when the mantle become worn and needs replacing. Since it is not practical to loosen the headnut by turning, it must be cut from the threaded section of the mainshaft. Removing the headnut in this manner damages the headnut beyond repair so that it cannot be used again. The threaded section of the mainshaft (or bearing sleeve) is also easily damaged when removing the headnut in this fashion, such that the threaded mainshaft or bearing sleeve must be repaired, or possibly replaced.

A solution to this problem in the prior art is to provide a burning ring between the mantle and the headnut. The burning ring is adapted so as to engage to the upper surface of the mantle and the lower surface of the headnut. When the mantle is being replaced, the burning ring is cut with a cutting torch, relieving the frictional forces bearing on the headnut. The threaded portion of the headnut may then be unscrewed from the shaft and the mantle can be removed.

Installation problems often arise because the headnut assembly must be tightened into contact with the mantle to prevent excess "play" between the components. The headnut is typically used to forcibly secure the mantle to the crushing head assembly by applying a large downward force on the top of the mantle. The headnut includes an internally threaded surface that engages an externally threaded surface on the mainshaft or a bearing sleeve supported on the mainshaft. In conventional gyratory crushers, downward force is applied to the mantle by screwing down the internally threaded headnut on the mating threads of the externally threaded mainshaft bearing sleeve. The turning effort is typically applied by a special wrench having a protruding arm. The large amount of turning effort that is needed to tighten down the headnut often requires the use of difficult mechanical operations to create the sufficient locking force to adequately secure the mantle on the mainshaft.

The inventors of the present disclosure identified the problems associated with the installation of the headnut and the difficult mechanical operation to provide the required holding force on the top edge of the mantle. As a result, the retainer assembly of the present disclosure was developed to solve the problems identified by the inventors.

SUMMARY

The present disclosure relates to a method and system for securing a mantle to a mainshaft of a gyratory crusher. More specifically, the present disclosure relates to a retainer assembly that improves the ease of connection between the mantle and mainshaft of a gyratory crusher.

The retainer assembly of the present disclosure includes a headnut having a body defined by a first face surface and a second face surface. The headnut is an annular member that includes a series of threads designed to be received by a mating series of threads on a bearing sleeve installed on the mainshaft. The headnut further includes a first series of bores and a second series of bores.

A burn ring is positioned below the headnut and is initially attached to the headnut by a series of connectors. The series of connectors extend through the first series of bores and are received in corresponding bores formed in the burn ring. When the burn ring is connected to the headnut by the series of connectors, the combination of the headnut and burn ring can be lifted into place above the mainshaft as a single unit.

A plurality of jacking bolts are received in the second series of bores formed in the headnut. Each of the jacking bolts are threaded into one of the bores of the second series of bores. During the initial installation of the headnut and burn ring on the mainshaft, the jacking bolts do not extend past the second face surface of the headnut. When the jacking bolts are rotated, the lower end of the jacking bolt extends past the second face surface of the headnut.

The retainer assembly further includes a hydraulic kit that includes a plurality of hydraulic cylinders. The hydraulic cylinders are connected to each other by a hydraulic fluid line. The hydraulic fluid line, in turn, is connected to a supply of pressurized hydraulic fluid. When the pressurized hydraulic fluid is supplied to the hydraulic cylinders, a cylinder rod and connected end effector extend away from the cylinder body. When the hydraulic fluid is removed, the cylinder rod and end effector are retracted in a direction toward the cylinder body.

In one embodiment of the present disclosure, the cylinder body includes threads formed along the outer surface of the cylinder body. The threads formed on the cylinder body allow the hydraulic cylinder to be securely received within one of the second series of bores formed in the headnut. Prior to being received in the second series of bores, the series of connectors used to attach the headnut to the burn ring must first be removed. Thus, the headnut will be disconnected from the burn ring, other than through friction forces created by the dowel pins, before the hydraulic cylinders can be installed.

Once the hydraulic cylinders are installed, the pressurized hydraulic fluid can be supplied to the hydraulic cylinders. The pressurized hydraulic fluid causes the cylinder rod and end effector to extend away from the cylinder body and move into contact with the top face surface of the burn ring. The continued movement of the end effectors causes the burn ring to be pressed into contact with the mantle and the headnut to move upward. This movement creates a gap between the burn ring and the headnut while also creating a locking force between the threads of the headnut and the threads of the bearing sleeve positioned on the mainshaft.

After the gap has been created, the plurality of jacking bolts are rotated until the end of the jacking bolt contacts the burn ring. In one exemplary embodiment, when all of the jacking bolts have been rotated into contact with the burn ring, one or more shims can be inserted into the gap. The shims are each designed with cutouts that allow the shims to be inserted when the jacking bolts are extended and the hydraulic cylinders are still pressurized.

With the jacking bolts and shims in place, the supply of pressurized hydraulic fluid can be removed, which causes the end effectors to retract. The jacking bolts and shims maintain the gap and the locking force after removal of the pressurized hydraulic fluid. In an exemplary embodiment, the cutouts formed in the shims also allow for expansion of the shims during pressure such that the material of shim can expand and fill a portion of the cutouts. The plurality of hydraulic cylinders can be removed from the headnut.

A headnut cover can then be installed over the headnut to protect the headnut and burn ring during operation of the gyratory crusher. The headnut cover is installed using a series of connectors that can be removed to allow removal of the headnut cover when the mantle needs to be removed and replaced.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
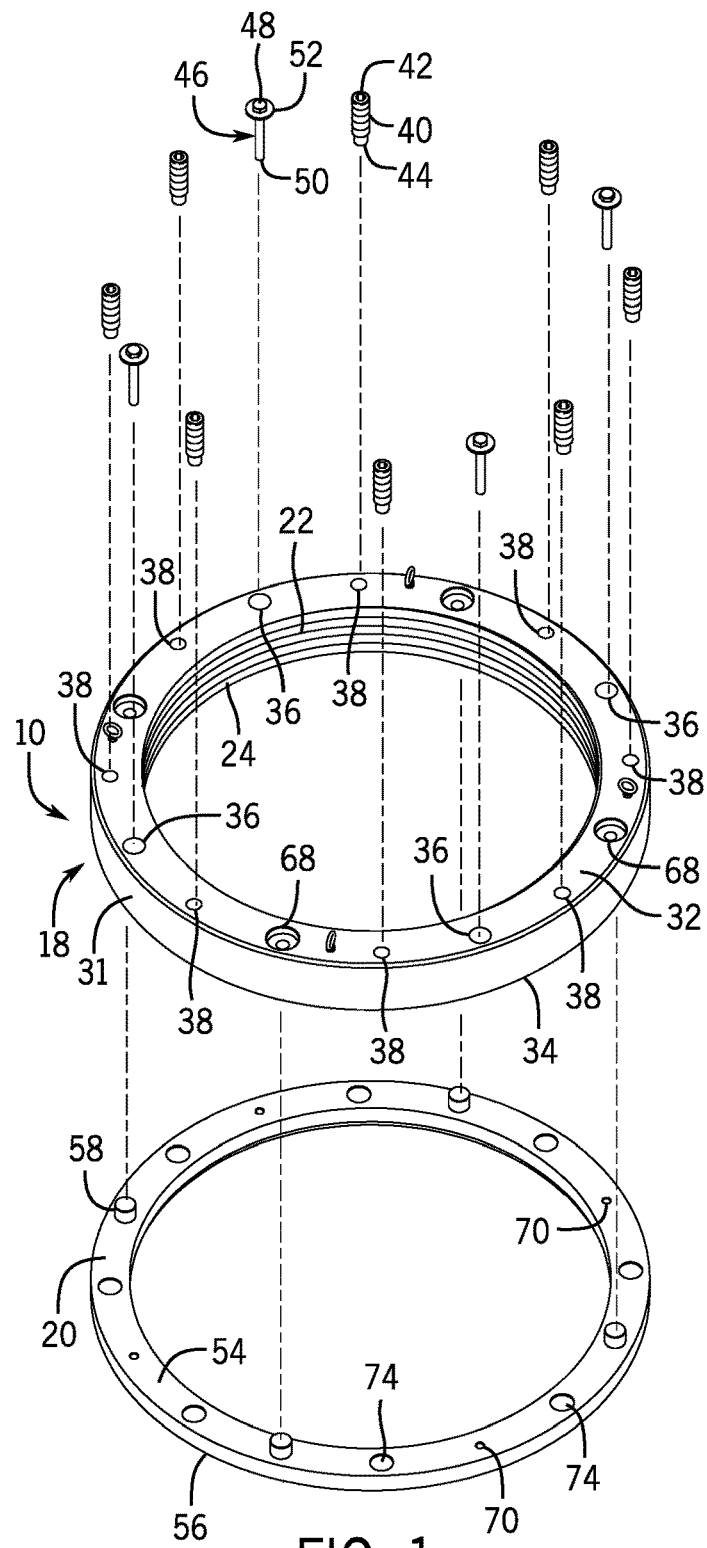
FIG. 1 is an exploded view of the headnut and burn ring of the retainer assembly of the present disclosure in a condition for lifting and installation.
Figure 3:
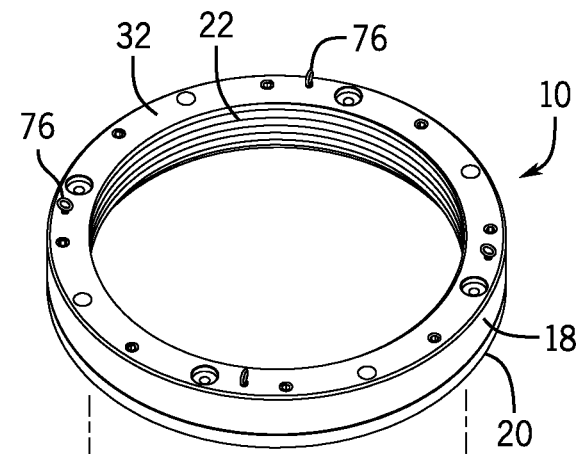
FIG. 3 is an exploded view showing the position of the headnut and burn ring above the mainshaft of a gyratory crusher prior to installation.
Figure 3:
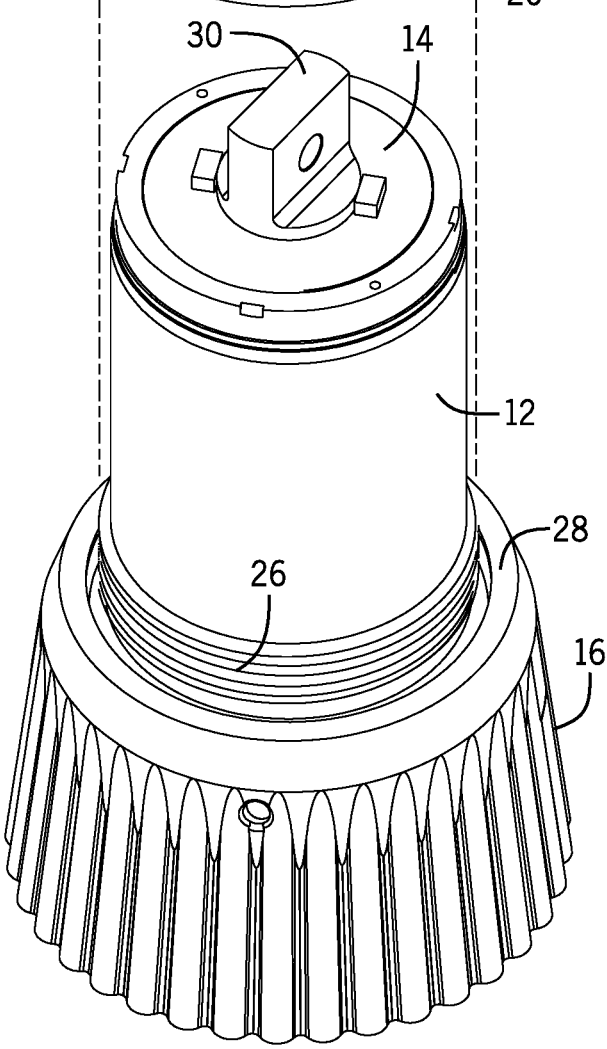

FIGS. 1 and 3 generally illustrate several of the components of the retainer assembly constructed in accordance with the present disclosure. As illustrated in FIG. 3, the illustrated components of the retainer assembly 10 are designed to be received along a bearing sleeve 12 that is positioned to surround a main shaft 14 of a gyratory crusher. The mainshaft 14 receives and supports a mantle 16 that is fitted around the outside of the mainshaft 14. The mantle 16 provides a replaceable wearing surface that needs to be replaced upon wear. The mantle 16 is held in place along the mainshaft 14 through use of the retainer assembly 10.

As shown in FIG. 1, the retainer assembly 10 includes a headnut 18 and a burn ring 20. The headnut 18 is a generally annular member formed from a durable metal material that includes a series of internal threads 22 formed along an annular inner surface 24. The internal threads 22 are designed to threadedly engage a series of external threads 26 formed on the lower end of the bearing sleeve 12. As the illustrated portion of the retainer assembly 10 is rotated along the external threads 26, the retainer assembly 10 contacts a top edge 28 of the mantle 16 to hold the mantle 16 in place along the mainshaft. As illustrated in FIG. 3, the mainshaft 14 includes a lifting lug 30 along the top end that provides a point of attachment for removing the entire mainshaft.

Referring back to FIG. 1, the headnut 18 includes a main body 31 that extends between a first, top face surface 32 and a second, bottom face surface 34. The annular main body 31 that extends between the top face surface 32 and the bottom face surface 34 further defines the inner surface 24 that includes the threads 22. In accordance with the present disclosure, the headnut 18 includes a first series of bores 36 that each extend through the body from the first face surface 32 to the second face surface 34. In the embodiment illustrated, the first series of bores 36 includes a total of four bores although other numbers are possible. The headnut 18 also includes a second series of bores 38 that also extend through the body from the first face surface 32 to the second face surface 34. In the embodiment illustrated, the second series of bores 38 eight bores although other numbers are possible In the embodiment shown in FIG. 1, each of the second series of bores 38 are designed to receive one of a plurality of jacking bolts 40. Each of the jacking bolts 40 includes an externally threaded main body that extends between a head 42 and a contact end 44. Each of the second series of bores 38 includes a threaded inner surface that is designed to threadedly receive and engage the outer surface of one of the jacking bolts 40.

The first series of bores 36 are designed to initially receive one of a plurality of connectors 46 that include an externally threaded outer shaft that extends between a head 48 and a lower end 50. A washer 52 is included as part of the connector 46 to prevent the head 48 from entering into the respective bore 36.

Figure 2A:
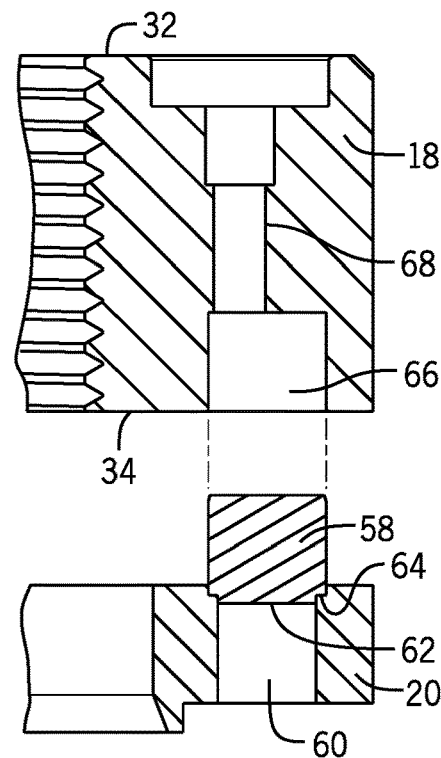
FIG. 2A is a magnified section view showing the attachment of a headnut to a burn ring.

In the embodiment illustrated in FIG. 1, the retainer assembly 10 includes the burn ring 20. However, it is contemplated that the retainer assembly 10 could be constructed in some embodiments in which the burn ring 20 is eliminated. In such an embodiment, the top edge of the mantle would be formed from a stronger material and would replace the function of the burn ring as discussed below. In another contemplated embodiment, the thickness of the burn ring 20 could be greatly reduced and the burn ring 20 could be formed from a stronger material such that a reduced thickness burn ring could carry out the functions set forth below. In the embodiment shown in FIG. 1, the burn ring 20 includes a first face surface 54 and a second face surface 56 that define the thickness of the annular body. As illustrated in FIG. 1, the burn ring 20 includes a plurality of dowel pins 58 that are each received within one of a plurality of dowel pin bores 60, which are best shown in FIG. 2A. Each of the dowel pin bores 60 is sized to receive a first end 62 of the dowel pin 58. The upper end of the dowel pin bore 60 defines a support shoulder 64 that allows the dowel pin 58 to securely seat within the top end of the dowel pin bore 60. The dowel pin 58 is designed to be pressed into place in the burn ring 20 as shown in FIG. 2A. In a contemplated alternate embodiment, the dowel pins 58 could be welded in place from underneath or a combination of welding and friction could be used to hold the dowel pins 58 in place. The outer diameter of the dowel pin 58 is designed to be received within a receiving portion 66 that is formed as part of a cover member bore 68 that also extends between the first face 32 and the second face surface 34 of the headnut 18.

Figure 2B:
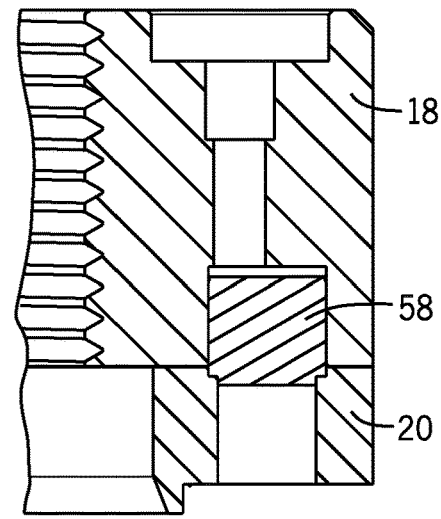
FIG. 2B is a section view similar to FIG. 2A showing the connection between the headnut and the burn ring.

As can be understood in FIGS. 2A and 2B, when the headnut 18 is moved downward toward the burn ring 20, the series of dowel pins 58 are received within the receiving portions 66 of the cover member bores 68 such that the dowel pins 58 create a friction fit to retain the burn ring 20 in contact with the second face surface 34 of the headnut 18, as best shown in FIG. 2B. In the configuration shown in FIG. 2B, the headnut 18 and the burn ring 20 are joined to each other in an initial configuration. The dowel pins 58 create a light press fit that holds the two components in this initial configuration.

Figure 2C:
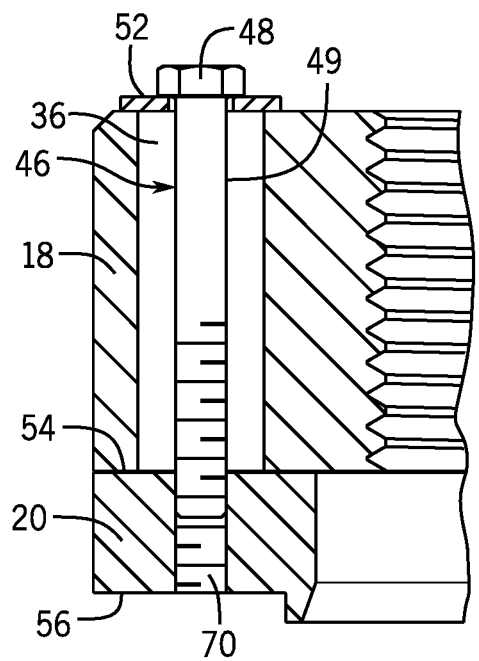
FIG. 2C is a section view showing the mechanical connection between the headnut and burn ring prior to installation onto the mainshaft.

Referring now to FIG. 2C, when the headnut 18 and the burn ring 20 are joined to each other through the use of the dowel pins, the headnut 18 can be more securely connected to the burn ring 18 by using the series of connectors 46. As indicated previously, each of the connectors 46 includes a head 48 and an externally threaded shaft 49. The lower end of the externally threaded shaft 49 is threadedly received within one of a plurality of attachment bores 70 that extend through the burn ring 20 from the first face surface 54 to the second face surface 56. The washer 52 is positioned below the head 48 to hold the head of the connector 46 above the inner diameter of the first series of bores 36. The threaded interaction between the shaft 49 and the internal threads formed in the attachment bore 70 securely attaches the headnut 18 to the burn ring 20. As illustrated in FIG. 1, in the embodiment illustrated, four separate connectors 46 are utilized and are spaced around the outer diameter of the headnut 18.

Figure 2D:
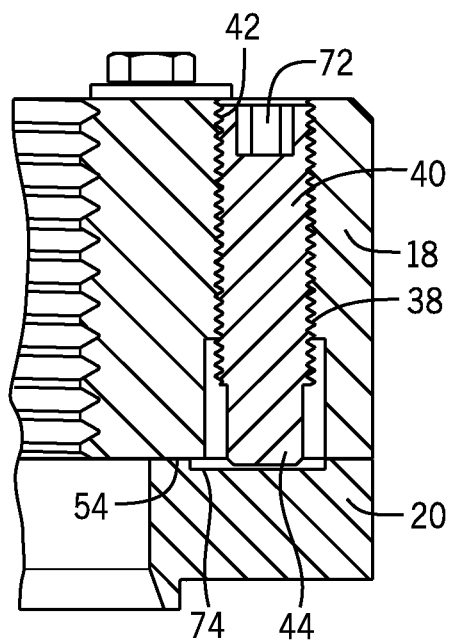
FIG. 2D is a section view showing the position of one of a plurality of jacking bolts received within the headnut.

Referring now to FIG. 2D, when the series of connectors 46 are used to join the headnut 18 to the burn ring 20, each of the individual jacking bolts 40 can be threadedly inserted into the second series of bores 38. Each of the jacking bolts 40 includes a recessed engagement portion 72 that extends into the body of the jacking bolt 40 from the top head portion 42. The main body of the jacking bolt 40 includes a series of external threads that engage a series of internal threads formed within each of the second series of bores 38. The length of the jacking bolt 40 is selected such that the contact end 44 is slightly spaced from the contact pads 74 that are slightly recessed from the first face surface 54 of the burn ring 20. In this manner, the jacking bolt 40 is entirely received within one of the second series of bores 38 during the initial installation process and does not exert any force on the burn ring 20.

Figure 4:
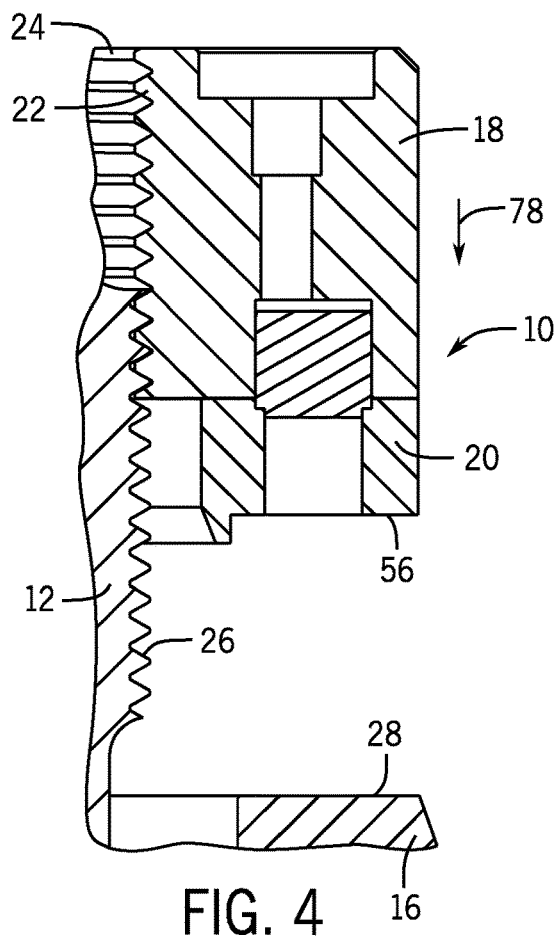
FIG. 4 is a section view showing the movement of the combination of the headnut and burn ring along the bearing sleeve.
Figure 6:
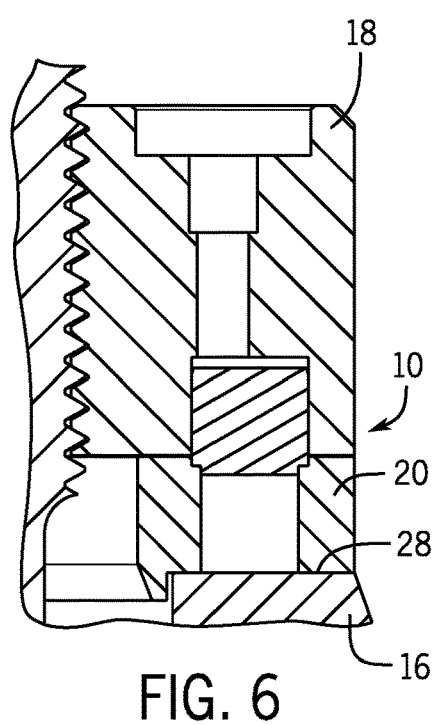
FIG. 6 is a section view similar to FIG. 4 showing the final position of the headnut and burn ring.
Figure 5:
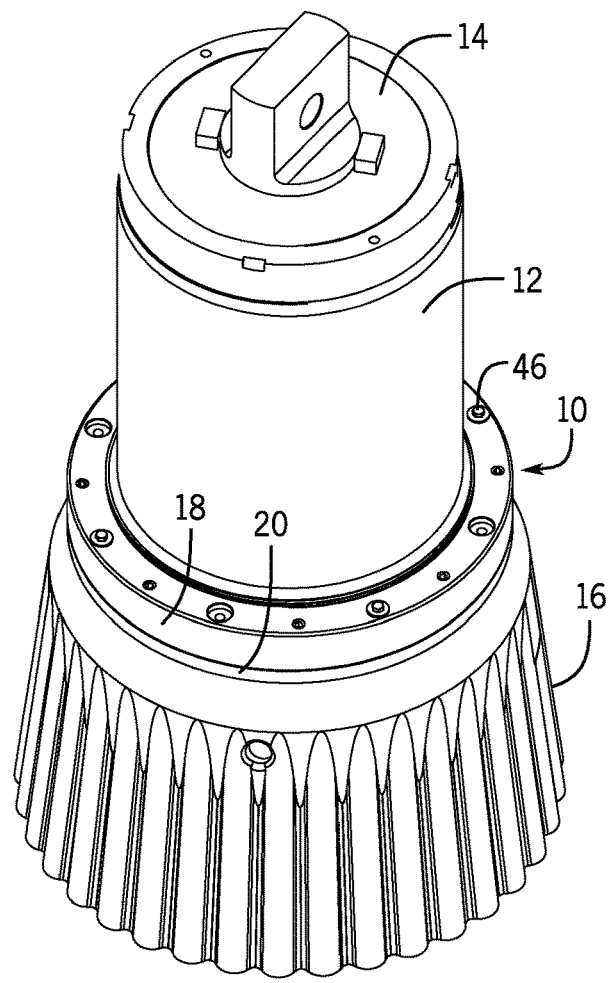
FIG. 5 is a perspective view showing the position of the headnut and burn ring to hold the mantle in place on the mainshaft.

As can be seen in FIG. 3, a series of lifting bolts 76 can be installed on the first face surface of the headnut 18. The lifting bolts 76 provide a point of attachment for lifting the combination of the headnut 18 and burn ring 20. As illustrated in FIG. 3, when the retainer assembly 10 is being lifted, the entire retainer assembly 10 can be lowered until the threaded portion of the headnut 18 contacts the external threads 26 formed on the bearing sleeve 12. FIG. 4 illustrates the initial contact between the threads 26 formed on the bearing sleeve 12 and the threads 22 formed along the inner surface 24 of the headnut 18. Upon this initial interaction, the combination of the headnut 18 and the burn ring 20 can be rotated using hand tools to cause the headnut 18 and burn ring 20 to move in a downward direction as illustrated by arrow 78. The rotation of the retainer assembly 10 can continue until the second face surface 56 of the burn ring comes into contact with the top edge 28 of the mantle 16. This interaction is best shown in FIG. 6. During installation in accordance with the present disclosure, the combination of the headnut and burn ring are threaded into place utilizing only a relatively small amount of force, such as by hand or by using a hand operated tool. The hand-tightening of the headnut and burn ring into contact with the top edge 28 of the mantle 16 is the initial step in the attachment process in accordance with the present disclosure. FIG. 5 shows this initial positioning of the retainer assembly along the mainshaft 14. In this position, the retainer assembly lightly holds the mantle 16 in place. In this configuration, the connectors 46 are still used to connect the headnut 18 to the burn ring 20.

Figure 7:
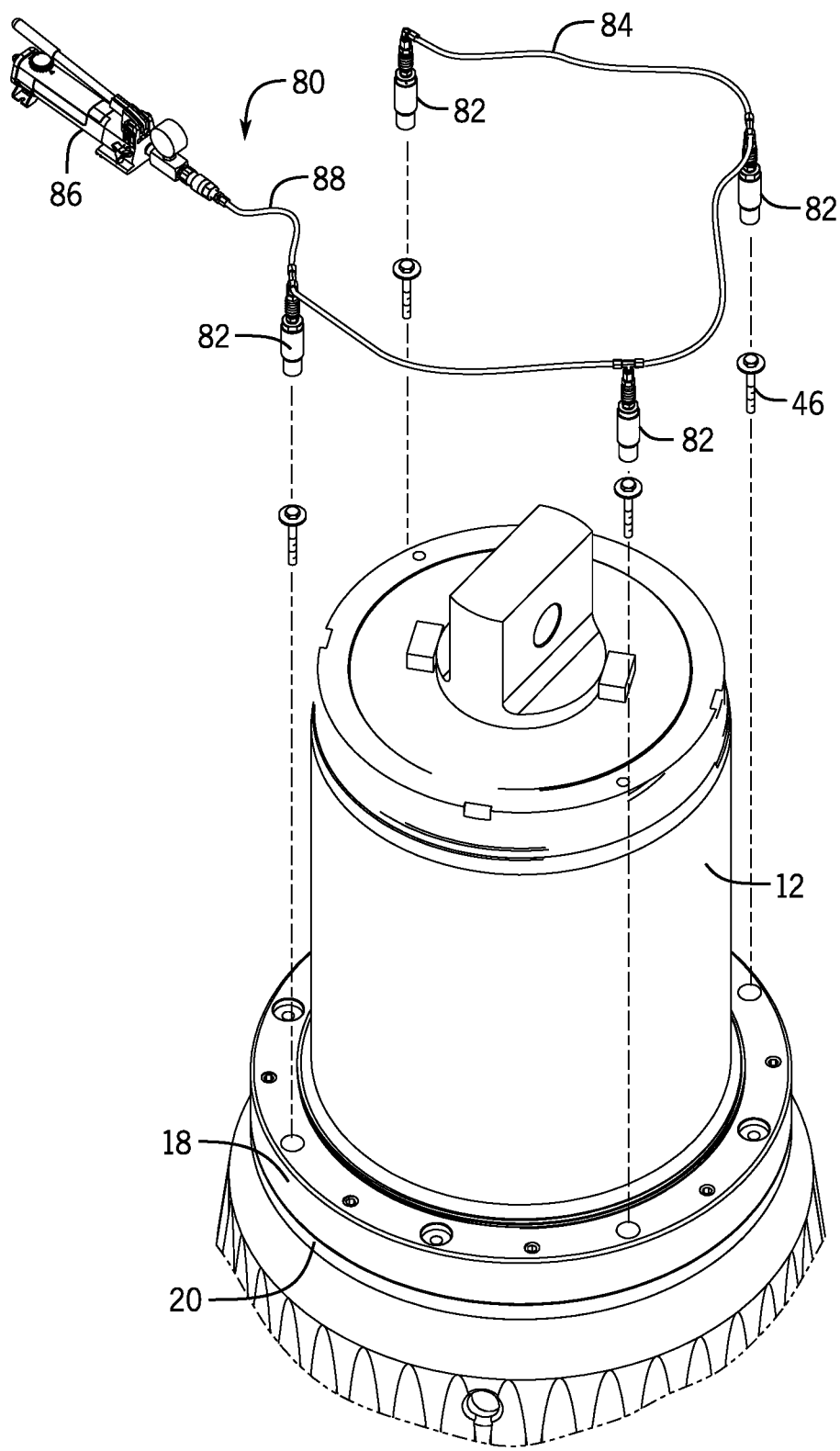
FIG. 7 is an exploded view showing the hydraulic kit relative to the installed headnut and burn ring.

Referring now to FIG. 7, once the combination of the headnut 18 and the burn ring 20 are installed along the bearing sleeve 12, each of the individual connectors 46 can be removed and a hydraulic kit 80 can be installed to perform the next step in the attachment process for securing the mantle 16 to the mainshaft. The hydraulic kit 80 is part of the entire retainer assembly and is used during the installation process as will be described. Although a hydraulic kit 80 is shown, other pressurized fluids or gases could be used in place of hydraulic fluid.

In the embodiment shown in FIG. 7, the hydraulic kit 80 includes a plurality of individual hydraulic cylinders 82 that are each connected to each other through a fluid line 84. The hydraulic fluid line 84 provides a fluid connection for hydraulic fluid to pass between each of the individual cylinders 82. The end hydraulic cylinder 82 is connected to a supply of pressurized hydraulic fluid 86 through a supply line 88. When the supply line 88 is connected to the supply of hydraulic fluid 86, the pressurized hydraulic fluid can flow between each of the individual hydraulic cylinders 82 in a well-known manner. The supply of hydraulic fluid 86 can be any type of hydraulic fluid supply that provides pressurized fluid at a desired fluid pressure. A hand pump is shown in the embodiment of FIG. 7, although other sources of pressure are contemplated as being within the scope of the present disclosure. In addition, although pressurized hydraulic fluid is described, other pressurized liquids or gases could be connected to the plurality of cylinders to provide the required driving force to move the cylinder rod and internal piston. As an exemplary alternate embodiment, the supply of pressurized fluid could be pressurized air or other gas and the cylinders could be gas or air actuated cylinders.

Figure 8:
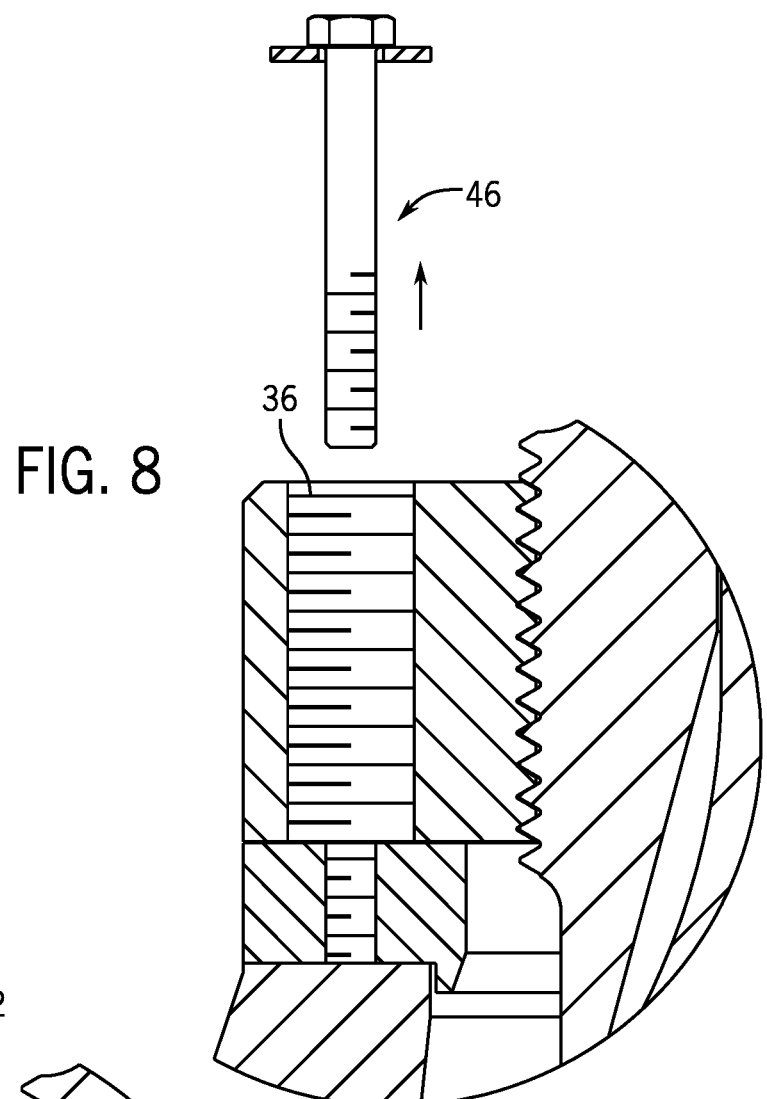
FIG. 8 is a section view showing the removal of the connecting bolts used to secure the headnut to the burn ring.

Referring now to FIG. 8, before the individual hydraulic cylinders 82 can be installed, each of the connectors 46 are removed from the respective first series of bores 36. Once each of the connectors 46 have been removed from the first series of bores 36, the individual hydraulic cylinders can be installed in the same first series of bores 36. Thus, the plurality of connectors 46 must be removed before the plurality of hydraulic cylinders 82 can be installed.

Figure 9:
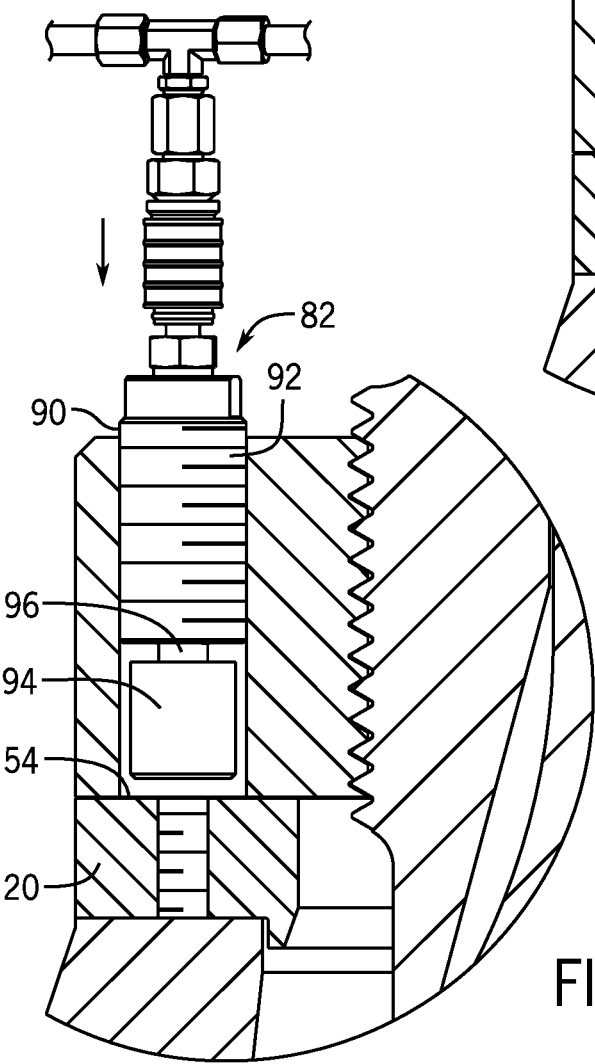
FIG. 9 is a partial section view showing the installation of one of the hydraulic cylinders of the hydraulic kit.

Referring now to FIG. 9, each of the individual hydraulic cylinders 82 includes a main cylinder body 90. The cylinder body 90 includes a series of external threads 92. The external threads 92 on the cylinder body 90 are configured to threadedly engage the internal threads formed along the inner surface of each of the first series of bores 36. In this manner, the hydraulic cylinders 82 can be threadedly received within the plurality of first series of bores 36.

As illustrated in FIG. 9, each of the hydraulic cylinders 82 includes an end effector 94 that is attached to a cylinder rod 96. The cylinder rod 96 is designed to be extended and retracted from within the cylinder body 90 upon application of pressurized hydraulic fluid to the hydraulic cylinder 82. The end effector 94 is shown in FIG. 9 in a retracted position in which the end effector 94 is slightly spaced from the first face surface 54 of the burn ring 20. Thus, in the non-pressurized condition, the end effector 94 does not exert any force on the burn ring 20.

Figure 12:
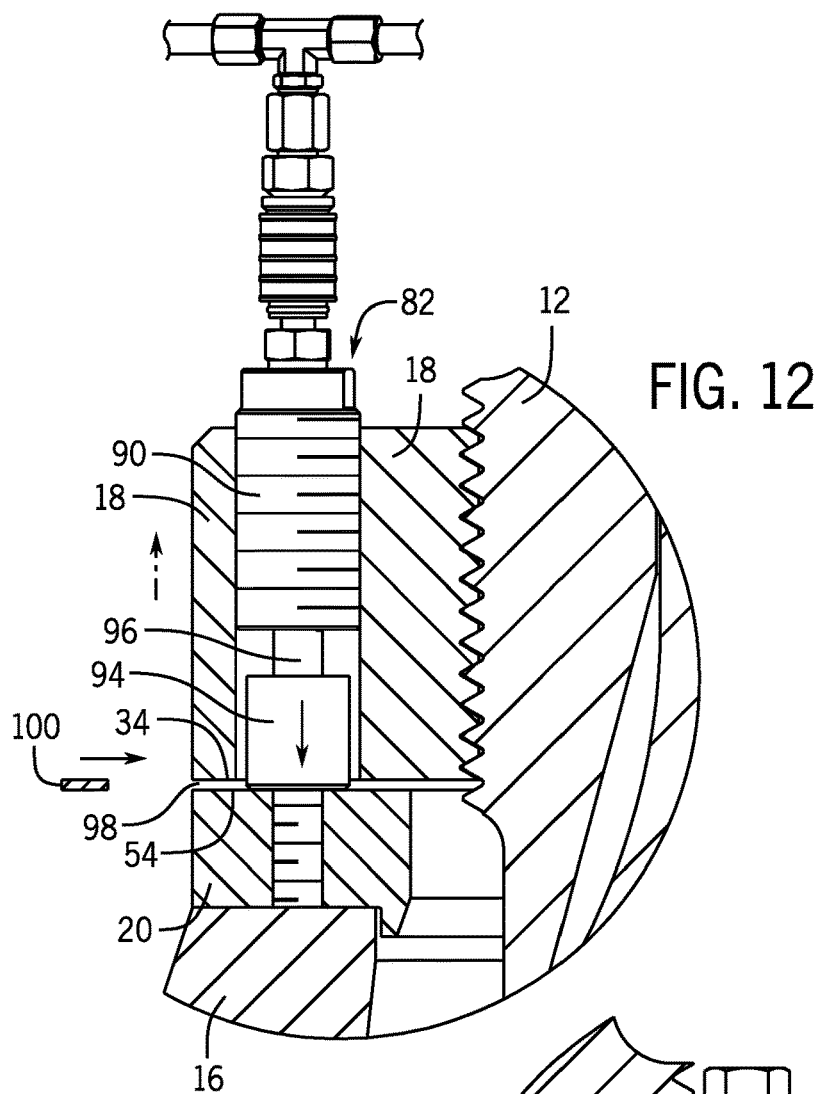
FIG. 12 is a section view illustrating the pressurization of the hydraulic cylinders to create a gap between the headnut and burn ring.

During the pressurization process, hydraulic fluid is applied to each of the individual hydraulic cylinders 82 as best shown in FIG. 12. When hydraulic fluid is applied to the hydraulic cylinder 82, the cylinder rod 96 extends from the cylinder body 90 such that the end effector 94 contacts the first face surface 54 of the burn ring 20. Since the end effector 94 is moved under the pressure created by the supply of hydraulic fluid, the downward movement of the end effector 94 creates a corresponding upward movement of the headnut 18 away from the burn ring 20. The upward movement of the headnut 18 creates a physical interaction between the threaded portion of the headnut 18 and the threaded portion of the bearing sleeve 12. The physical interaction between the threaded portions of the headnut 18 and the bearing sleeve 12 creates a locking force on the burn ring 20 and thus the mantle 16.

As illustrated in FIG. 12, when the individual hydraulic cylinders 82 are pressurized, the downward movement of the end effector 94 creates a gap 98 between the second face surface 34 of the headnut 18 and the first face surface 54 of the burn ring 20. The gap 98 created can have range of sizes. In the embodiment illustrated, the gap 98 has a dimension of approximately 3.2 millimeters, although other sizes for the gap 98 are certainly contemplated as being within the scope of the present disclosure.

Figure 13:
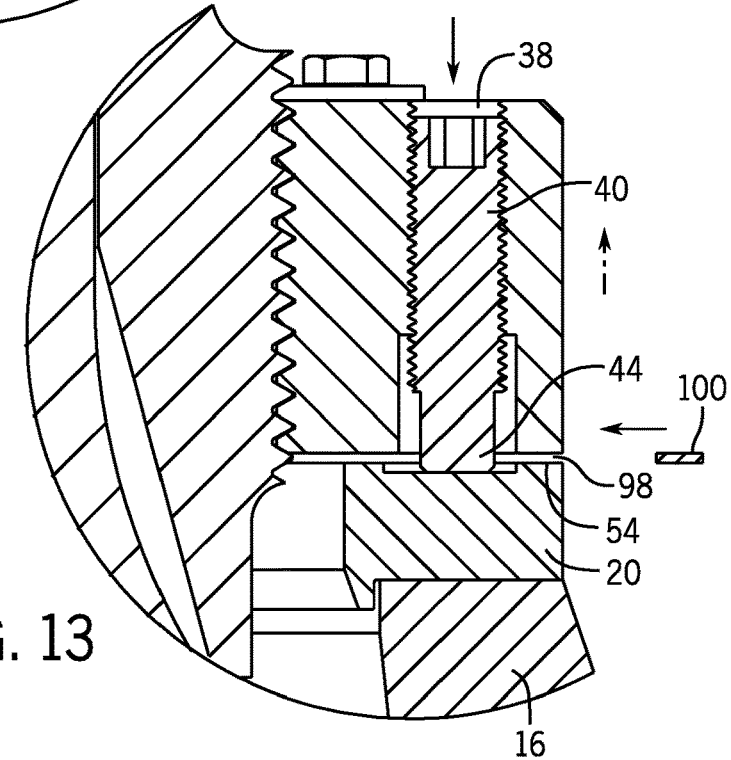
FIG. 13 is a section view illustrating the movement of the jacking bolts to maintain the created gap and the insertion of a shim.

Referring now to FIG. 13, once the gap 98 has been created through the pressurization of the individual hydraulic cylinders 82, the size of the gap can be maintained by use of the series of jacking bolts 40. Specifically each of the individual jacking bolts 40 is rotated within the respective bore to cause the contact end 44 of the jacking bolt 40 to contact the first surface 54 of the burn ring 20 as illustrated in FIG. 13. Since each of the jacking bolts 40 is threaded into one of the second series of bores 38, the plurality of jacking bolts 40 can be used to maintain the gap 98 even when the individual hydraulic cylinders 82 are depressurized.

In accordance with the present disclosure, once the jacking bolts 40 are rotated into contact with the burn ring 20, one or more individual shims 100 can be inserted into the gap 98 to maintain the gap during operation of the gyratory crusher. In the embodiment illustrated in FIGS. 10 and 11, the shims 100 are formed as separate segments that can be combined to create either an entire annular ring or portions of an annular ring. It is contemplated that multiple numbers of shims 100 could be utilized to help maintain the size of the gap between the headnut and the burn ring. In the embodiment shown in FIG. 11, the individual shims include a series of cutouts 102 that are sized to receive the contact end of each of the jacking bolts 40 and the dowel pins. In this manner, the shims 100 can be inserted as shown in FIG. 13 while the jacking bolts 40 maintain the size of the gap 98 and the dowel pins join and align the headnut and the burn ring. Further, the cutouts 102 can also allow the shim 100 to be inserted while the hydraulic cylinders are pressurized and the dowel pins are installed, as shown in FIG. 12.

Once the individual shims 100 have been securely positioned in place, the hydraulic fluid applied to each of the individual hydraulic cylinders can be removed. The combination of the jacking bolts 40 and shims 100 maintain the gap 98 and also maintain the physical interaction between the threaded portions of the headnut 18 and the threaded portion of the bearing sleeve. After the hydraulic fluid has been removed from each of the cylinders 82, the threaded bodies of each of the cylinders 82 can be rotated to remove the hydraulic cylinders 82 from the headnut 18.

Figure 10:
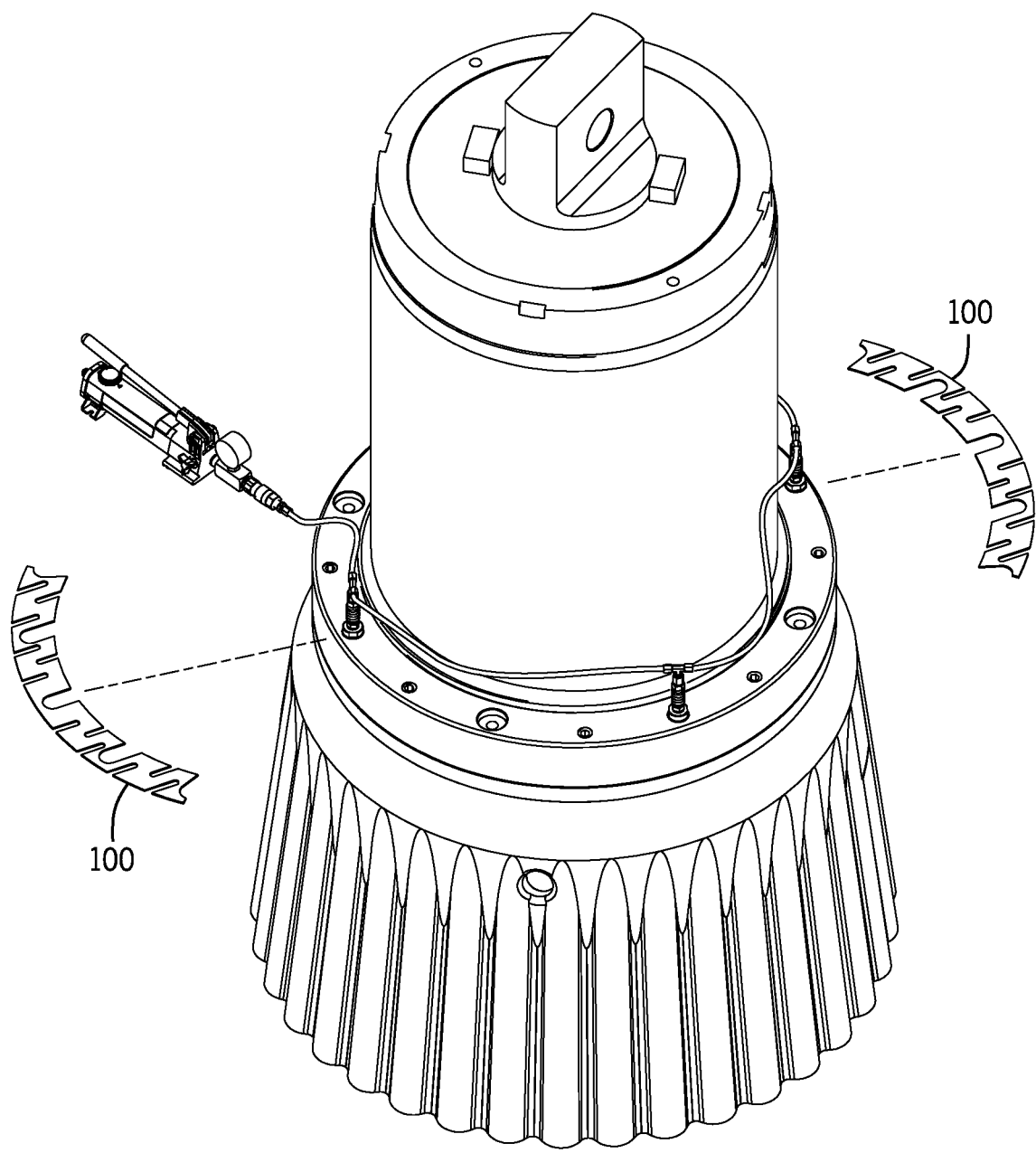
FIG. 10 is a perspective view showing the connection of the hydraulic kit and the position of one or more shims.
Figure 11:
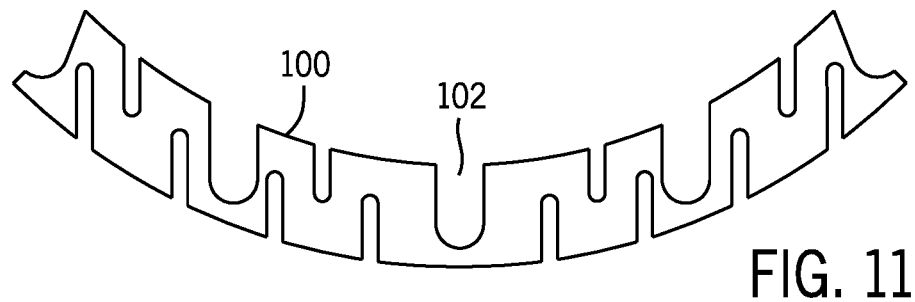
FIG. 11 is a top view of one of the shims shown in FIG. 10.
Figure 14:
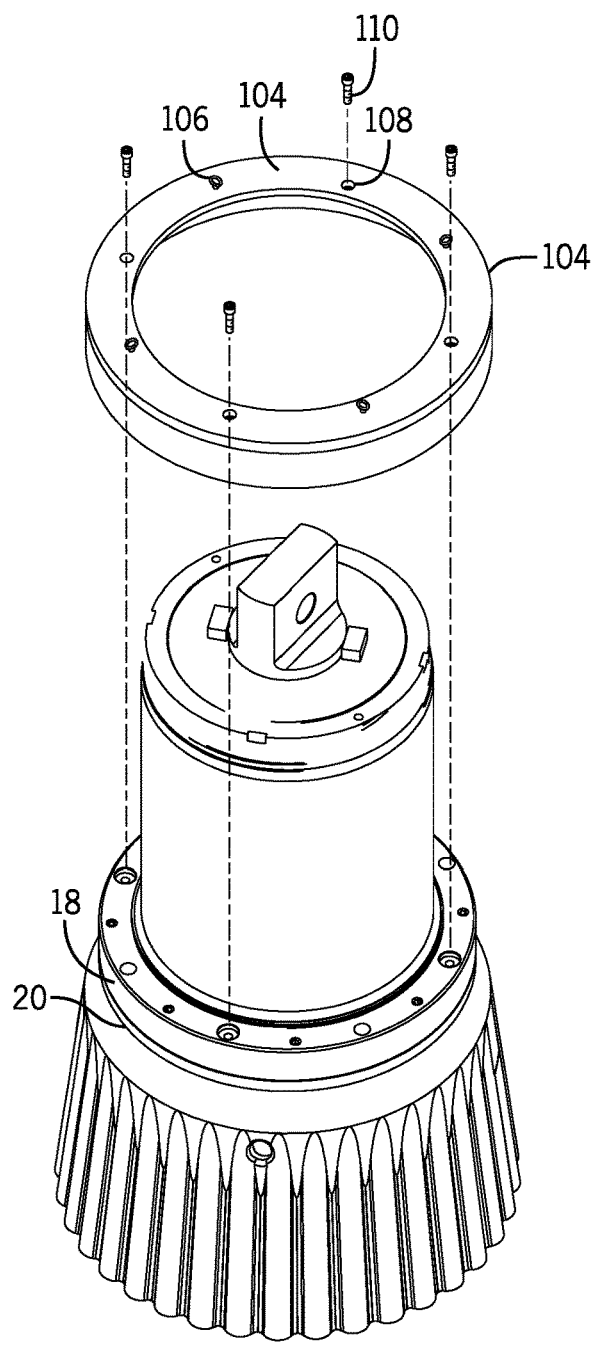
FIG. 14 is an exploded perspective view of the installation of the headnut cover.
Figure 15:
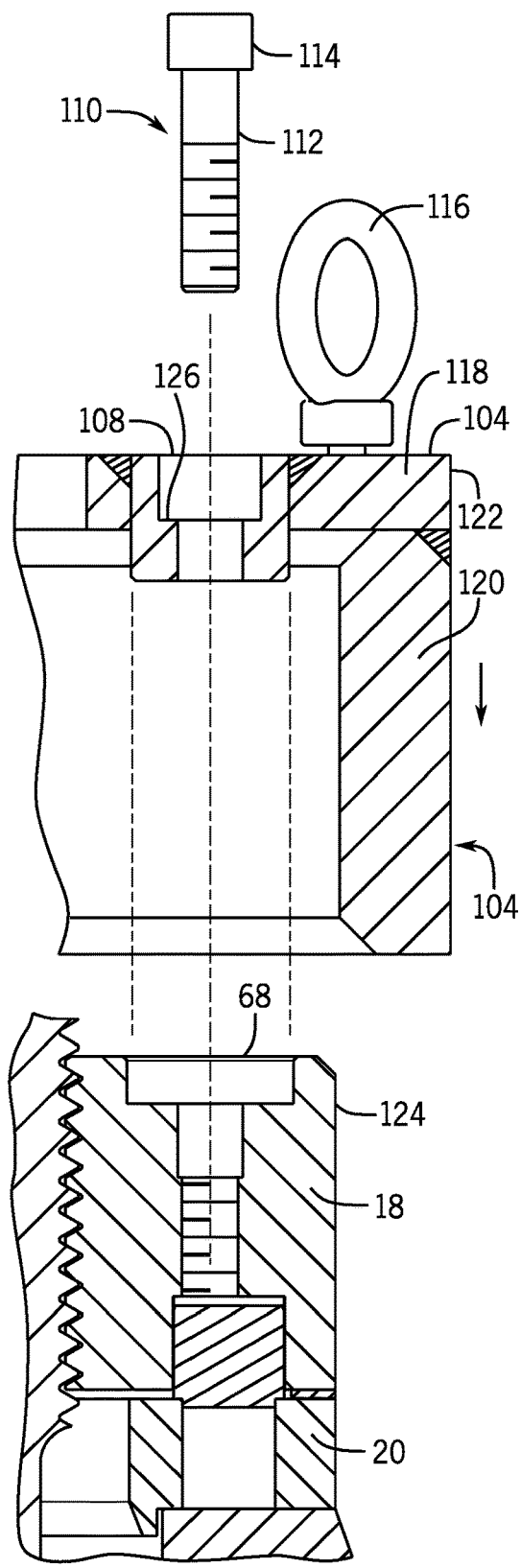
FIG. 15 is a magnified, section view showing the installation of the headnut cover onto the headnut.

FIG. 14 illustrates the installed headnut and burn ring after the removal of the hydraulic cylinders as compared to the embodiment shown in FIG. 10. Once the hydraulic cylinders of the hydraulic kit are removed, a headnut cover 104 can be installed over the combination of the headnut 18 and the burn ring 20. The headnut cover 104 is designed to cover the headnut 18 during operation of the gyratory crusher to reduce the damage to the headnut 18. The headnut cover 104 is an annular member that includes a top face surface 106 that includes a plurality of bores 108 that are each designed to receive threaded connector 110. Each threaded connector 110 includes a threaded shaft 112 and a head 114, as illustrated in FIG. 15. Referring back to FIG. 14, the headnut cover 104 includes a plurality of lifting lugs 116 that provide a point of attachment for lifting the headnut cover 104 and installing it over the headnut 18.

As illustrated in the section view of FIG. 15, the headnut cover 104 includes a top wall 118 and a depending side wall 120. The depending side wall 120 is connected to the top wall 118 along the radial outer edge 122. The side wall 120 is designed to have an inner circumference that is designed to fit over the outer surface 124 of the headnut 18.

Figure 16:
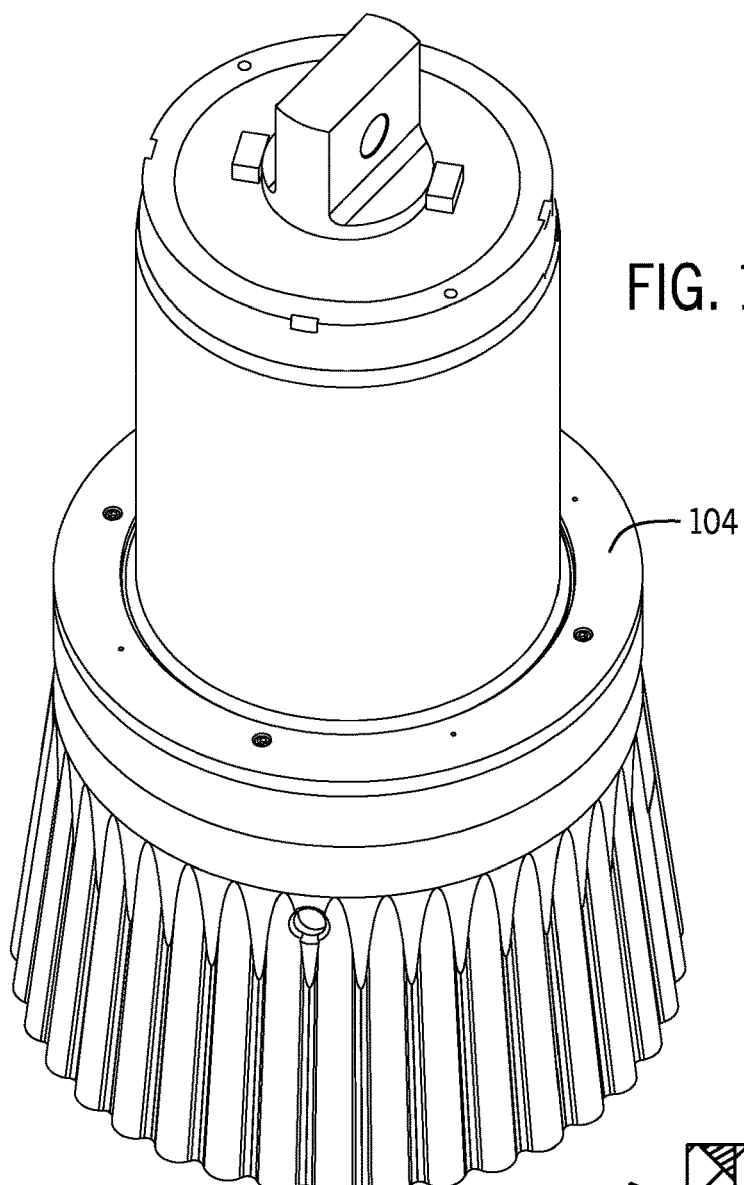
FIG. 16 is a perspective view showing the installation of the headnut cover.
Figure 17:
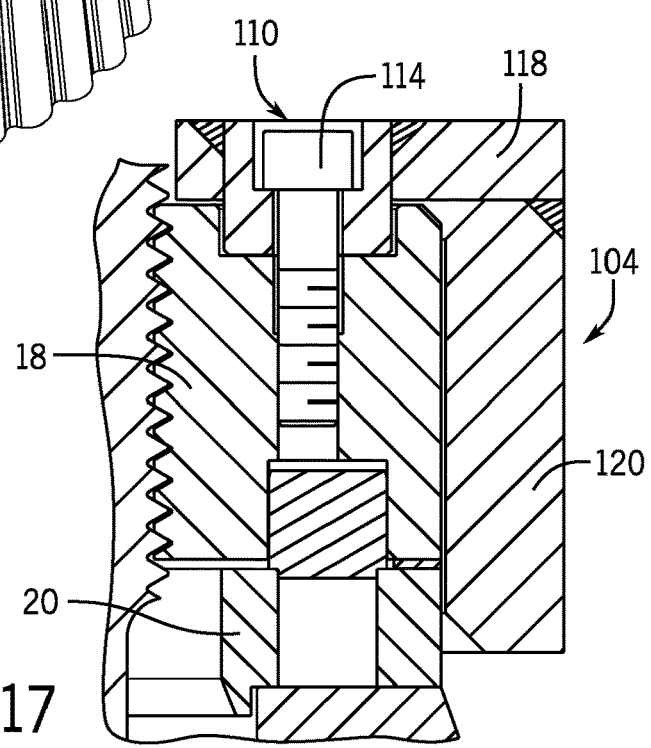
FIG. 17 is a section view showing the attachment of the headnut cover.

The bores 108 extending into the top face surface 106 are each designed to include an internal shoulder 126 that is designed to receive the head 114 of one of the connectors 110. FIG. 17 illustrates the mounting of the headnut cover 104 onto the combination of the headnut 18 and the burn ring 20. In this configuration, the threaded shaft of the connector 110 is received within the internal threaded portion of one of the cover member bores 68. In this manner, headnut cover 104 can be securely attached to the headnut as best illustrated in FIGS. 16 and 17.

During replacement of mantle 16, headnut cover 104 is first removed from the headnut 18 by removing the series of connectors 110. Once the headnut cover 104 is removed, the burn ring 20 can be cut using a torch, which removes the tension on the headnut 18. The headnut 18 can then be rotated away from the mantle 16 and the mantle removed from the mainshaft.

In another embodiment, once the headnut cover 104 has been removed, the plurality of hydraulic cylinders 82 could be reinstalled into the first series of bores in the headnut. Once the hydraulic cylinders 82 of the hydraulic kit are reinstalled, the pressurized hydraulic fluid can again be applied to the hydraulic cylinders 82 to help loosen the connection between the headnut and the mainshaft. Once the threaded connection is loosened, the jacking bolts could be retracted combination of the headnut and burn ring could be removed, which would allow for reuse of the burn ring.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A retainer assembly for securing a mantle on a mainshaft of a gyratory crusher, the assembly comprising:
    a headnut having a body defined by a first face surface and a second face surface, the headnut including first series of bores extending through the body and a second series of bores extending through the body;
    a plurality of jacking bolts each received in one of the second series of bores formed in the headnut; and
    a plurality of cylinders and a supply of pressurized fluid in communication with the plurality of cylinders, wherein each of the plurality of cylinders includes an end effector attached to a cylinder rod that extends from the cylinder when the pressurized fluid is supplied to the cylinder, wherein the plurality of cylinders are each received in one of the first series of bores in the headnut,
    wherein when the supply of pressurized fluid is supplied to the plurality of cylinders, the cylinder rod and the attached end effector extend away from the cylinder to create a gap between the second face surface of the headnut and the mantle.

2. The retainer assembly of claim 1 further comprising a burn ring positioned in contact with the second face surface of the headnut and having a body, wherein the burn ring is positioned between the mantle and the headnut when the headnut is installed on the mainshaft.

3. The retainer assembly of claim 2 further comprising a plurality of connectors each positionable to extend through the first series of bores in the headnut and to be received in one of a plurality of threaded bores formed in the body of the burn ring to join the headnut to the burn ring for installation onto the mainshaft.

4. The retainer assembly of claim 3 wherein the plurality of connectors are removed before the plurality of cylinders are received in the first series of bores in the headnut.

5. The retainer assembly of claim 1 wherein each of the cylinders includes a cylinder body having a threaded outer surface that engages an internally threaded inner surface of the first series of bores formed in the headnut.

6. The retainer assembly of claim 1 further comprising a shim that is positionable within the gap.

7. The retainer assembly of claim 1 wherein each of the jacking bolts threadedly engages one of the second series of bores formed in the headnut.

8. The retainer assembly of claim 1 further comprising a headnut cover configured to be received on the headnut, the headnut cover including a plurality of alignment bosses sized to be received in one of the first bores formed in the headnut.

9. A gyratory crusher comprising:
    a mainshaft;
    a mantle positioned along the mainshaft;
    a retainer assembly for securing the mantle on the mainshaft, the retainer assembly comprising:
    a headnut having a body defined by a first face surface and a second face surface, the headnut including first series of bores extending through the body and a second series of bores extending through the body;
    a burn ring positioned in contact with the second face surface of the headnut and having a body;
    a plurality of jacking bolts each received in one of the second series of bores formed in the headnut; and
    a plurality of cylinders in communication with a supply of pressurized fluid, wherein each of the plurality of cylinders includes an end effector attached to a cylinder rod that extends from the cylinder when the pressurized fluid is supplied to the cylinder, wherein the plurality of cylinders are each received in one of the first series of bores in the headnut,
    wherein when the supply of pressurized fluid is supplied to the plurality of cylinders, the cylinder rod and the attached end effector extend away from the cylinder to create a gap between the second face surface of the headnut and the burn ring.

10. The gyratory crusher of claim 9 further comprising a plurality of connectors each positionable to extend through the first series of bores in the headnut and to be received in one of a plurality of threaded bores formed in the body of the burn ring to join the headnut to the burn ring for installation onto the mainshaft.

11. The gyratory crusher of claim 10 wherein the plurality of connectors are removed before the plurality of cylinders are received in the first series of bores in the headnut.

12. The gyratory crusher of claim 9 wherein each of the cylinders includes a cylinder body having a threaded outer surface that engages an internally threaded inner surface of the first series of bores formed in the headnut.

13. The gyratory crusher of claim 9 further comprising a shim that is positionable within the gap.

14. The gyratory crusher of claim 9 wherein each of the jacking bolts threadedly engages one of the second series of bores formed in the headnut.

15. The gyratory crusher of claim 9 further comprising a headnut cover configured to be received on the headnut, the headnut cover including a plurality of alignment bosses sized to be received in one of the first bores formed in the headnut.

* * * * *